United States Patent [19]

Moffat et al.

[11] 4,020,865
[45] May 3, 1977

[54] REMOTE POWDER DETERGENT DISPENSER

[75] Inventors: Robert B. Moffat, West St. Paul; David L. Nystuen, Bloomington; Thomas H. Imdieke, Circle S. Hastings, all of Minn.

[73] Assignee: Economics Laboratory, Inc., St. Paul, Minn.

[22] Filed: Oct. 3, 1975

[21] Appl. No.: 619,530

[52] U.S. Cl. .................................. 137/268; 222/67; 23/271 R; 23/267 E
[51] Int. Cl.² .......................................... B67D 5/08
[58] Field of Search ............... 137/268, 88; 222/67; 23/271, 267 E, 269, 272.7, 272.8; 340/244; 307/252

[56] References Cited
UNITED STATES PATENTS

| | | | |
|---|---|---|---|
| 2,546,317 | 3/1951 | Prizer | 137/267 X |
| 2,604,386 | 7/1952 | Arant | 23/271 X |
| 3,574,561 | 4/1971 | Nickerson et al. | 23/267 E X |
| 3,595,438 | 7/1971 | Daley | 23/271 X |
| 3,680,070 | 7/1972 | Nystuen | 137/88 X |
| 3,727,889 | 4/1973 | Nagel | 23/267 E X |
| 3,850,344 | 11/1974 | Burge et al. | 23/271 X |

*Primary Examiner*—Alan Cohan

*Attorney, Agent, or Firm*—Merchant, Gould, Smith, Edell, Welter & Schmidt

[57] ABSTRACT

A system for converting powdered detergent in a shipping container into a concentrated detergent solution and for maintaining a predetermined volume of the solution available for use by a remotely located washing apparatus. A chassis defines a reservoir suitable for holding concentrated detergent solution and has an inlet port opening into the reservoir. A curved screen member is continuously mounted across and extends into the open mouth end of a detergent-filled container. A cradle assembly pivotally positions the container and screen in inverted position over the inlet port to the reservoir such that the curved screen retainably supports the detergent within the container. A single nozzle is mounted at the inlet port for uniformly directing a spray of solution from the reservoir against substantially the entire downwardly facing surface of the screen, dissolving a portion of the detergent carried thereby, which passes in solution through the screen and into the underlying reservoir. Automatic safety control apparatus protects operators of the system from hazardous spray of solution from the nozzle by preventing energization of the pump which feeds solution to the nozzle whenever the container is not operatively positioned overlying the inlet port and in locked sealing engagement with the chassis.

23 Claims, 10 Drawing Figures

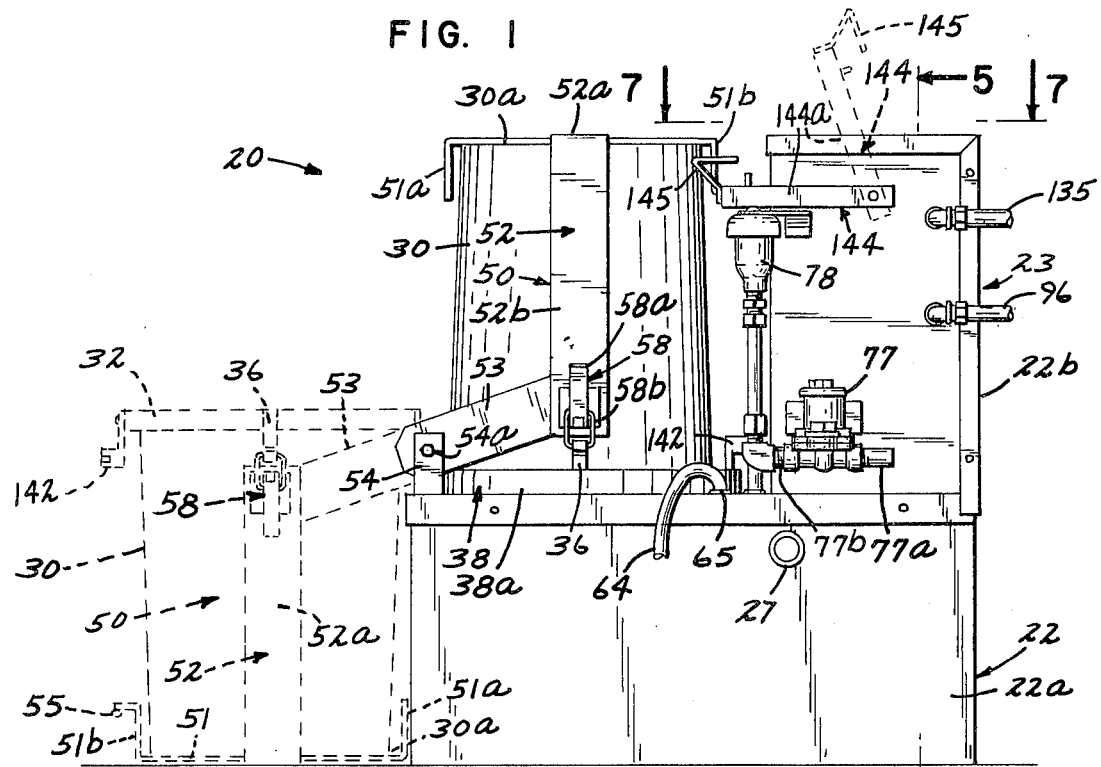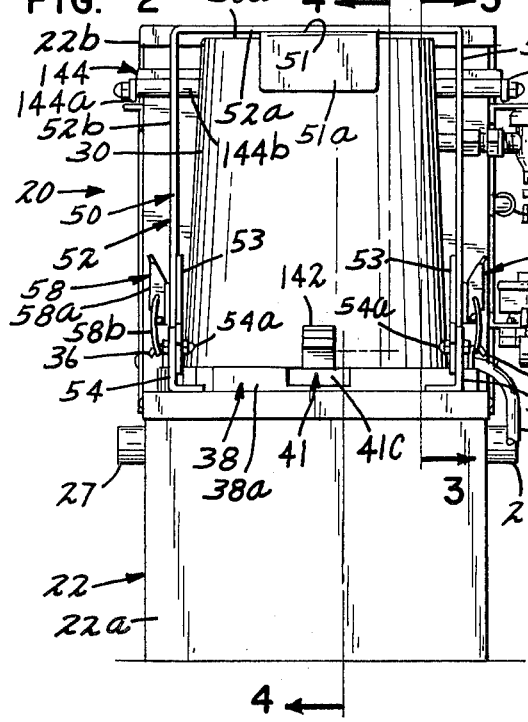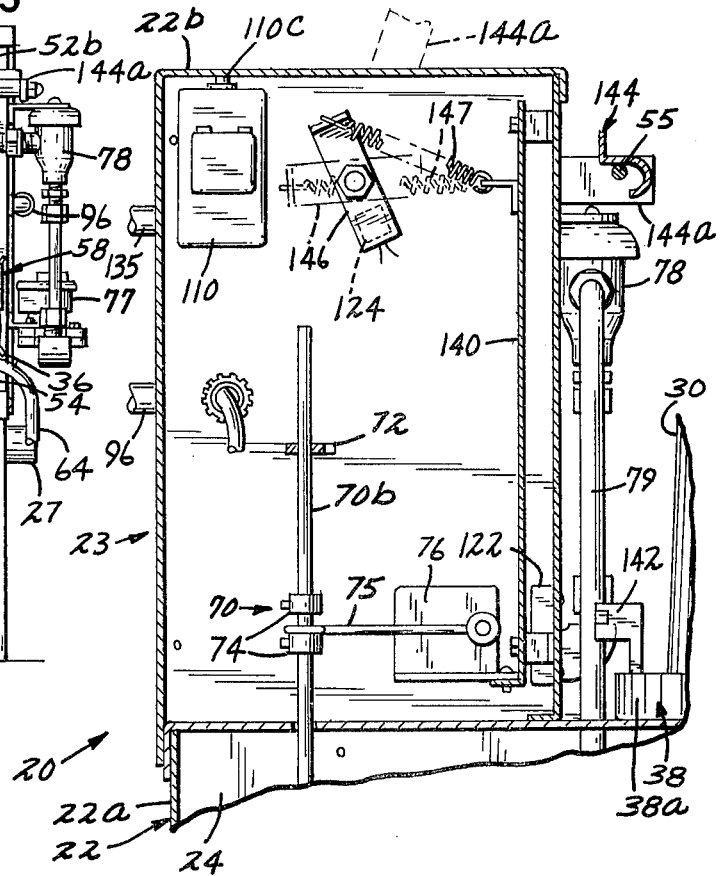

REMOTE POWDER DETERGENT DISPENSER

BACKGROUND OF THE INVENTION

1. Field of the Invention

This invention relates generally to detergent dispensing systems and more particularly to a detergent dispensing system for automatically converting powered detergent within a container into a concentrated detergent solution for maintaining a predetermined volume of the solution available for use.

2. Description of the Prior Art

Washing machines used in industrial applications such as in restaurants, laundries, car washes and other institutionalized applications, typically include a holding tank which forms an integral part of the washing apparatus proper, for holding a detergent solution available for use and/or recirculation within the washing machine as required by the various washing cycles thereof. These types of washing machines typically run on a continual basis and it is necessary to periodically add detergent to the holding tank as the detergent solution is used or becomes diluted during washing operations. It has become commonplace for a concentraton regulating apparatus to be used for maintaining the detergent concentration level within the holding tank at a predetermined strength. The regulating apparatus generally includes level sensing means and a conductivity cell within the holding tank for providing output control signals to maintain the volume level and concentration strength respectively of the detergent solution within the holding tank at predetermined valves.

The detergent for supplying such industrial washing machines and particularly with respect to industrial dishwashing machines and industrial conveyor-type washing machines, is typically purchased in powdered form housed in cylindrical shipping containers either in larger 30 gallon sizes or in easier-to-handle 5 to 10 gallon sizes. Since these washing machines consume large quantities of detergent, thus requiring frequent recharging of the detergent feeding apparatus, it has become commonplace to supply the holding tank with concentrated detergent solution from detergent dispensers which are remotely located from the washing machine proper. Such remotely located detergent dispensers can conveniently be positioned near the supply of washing detergent and can be rapidly loaded and unloaded without disrupting the operations of the washing machine proper and without interfering with the activities of the staff attending to or working adjacent the washing machine proper. Use of remotely located detergent dispensers also facilitates maintenance and repairs of both the detergent dispenser apparatus and the washing machine proper.

A plurality of such remote powdered detergent dispensers have appeared in the prior art. The practical embodiments of such dispensers have typically positioned the detergent bearing container in inverted manner over an underlying reservoir suitable for maintaining a predetermined volume of concentrated detergent solution available for supplying the holding tank of the washing machine proper. A screen having mesh sufficiently small to prevent dry powder from sifting therethrough is placed between the open end of the container and the underlying reservoir. Various spray nozzle jet configurations have been devised for directing water or solution jets or sprays through the screen into wetting engagement with the detergent carried thereby, causing saturated detergent solution to fall through the screen and into the underlying reservoir. One such early prior art design used a flat screen with a 12-jet manifold strategically positioned therebelow for directing a spray of water against the entire bottom surface of the screen. This combination proved to be unsatisfactory for commercial usage since it resulted in channeling of the detergent in the container, causing excess hydration and caking. A desirable system will not form channels within the powdered detergent, but will cause even hydration of the powdered detergent for a distance of approximately one-half inch above the retaining screen. Such low-wetting penetration into the detergent is particularly important when using powdered detergents containing active chlorine, since much of the chlorine contained in such detergent is lost through decomposition once the detergent is wetted. The composition and concentration of the detergent solution produced by the above described prior art technique significantly varied with the amount of detergent remaining within the container. The channeling inherent with that technique also permitted undesirable caking at distances well above the retaining screen, making it difficult to completely dissolve the detergent within the container and resulting in significant waste of the detergent.

Another prior art design, owned by the assignee of this invention, and described in the U.S. Pat. No. 3,595,438 to Daley et al, solved a majority of the problems of prior designs in the art by providing a curved screen between the container and the underlying reservoir which is positioned to extend into the container for supporting the powdered detergent thereabove. The Daley apparatus uses a single nozzle disposed below the curved screen for directing a low-pressure spray of water of sufficient size to cover the entire downwardly facing surface of the screen. The spray nozzle is cooperatively aligned with the screen member such that each droplet of water from the spray impinges upon the screen member in a direction generally perpendicular thereto. With the Daley apparatus, virtually no channeling of the powdered detergent occurs, and approximately only one-half inch of the powdered detergent overlying the screen is hydrated by the spray. This apparatus also provides for even use distribution of the detergent, thus eliminating practically all waste thereof. However, since plain water is sprayed from the nozzle, the Daley apparatus is susceptible to limited flushing action of the detergent cake which forms immediately above the curved screen, causing potentially wide variances in the concentration level of the detergent solution produced by such flushing action.

Another detergent dispenser apparatus attempting to improve upon the Daley apparatus, is disclosed in U.S. Pat. No. 3,850,344 to Burge et al. This apparatus employs a flat screen overlying a perforated flat support plate, which combination supports the powdered detergent within an inverted container. A single high velocity jet stream of concentrated solution from the underlying reservoir is directed through a hole formed through the center of the supportive plate and screen such that the stream passes only into the center of the powdered detergent mass within the container. The jet stream forms a channel passing entirely through the detergent mass along the longitudinal central axis of the container and is redirected back from the bottom of the inverted container into the underlying detergent mass. This action results in hydration of substantially the entire contents of the powdered detergent, with the redirected stream falling by gravity through the screen and perforated supportive plate into the underlying reservoir. The Burge type of apparatus is limited in its application to use with those powdered detergents which do not contain chlorine, since the chlorine is decomposed in the powdered detergent mass in a relatively short time following the initial wetting of the detergent mass when such an apparatus is employed.

Notably lacking from the prior art remote detergent dispensing systems is such an apparatus that can be flexibly used to reliably dispense powdered detergents of any consistency and composition in a manner that produces highly concentrated detergent solutions of uniform composition throughout the conversion of the entire contents of a detergent holding container, and which minimizes waste due to unusable residues remaining in the dispensing container. Also notably lacking from the prior art devices is the provision therein of automatic safety features, particularly in those apparatus which direct under force highly caustic concentrated detergent solutions which can be extremely hazardous to an operator if accidently directed at his face during the removal of the spent container from the apparatus. Such safety features become of particular concern for those systems which use the easy to handle 5 to 10 gallon detergent holding containers, which an operator can maneuver out of operative position overlying the reservoir so rapidly that he may inadvertently neglect to manually secure the apparatus against any potentially hazardous conditions prior to proceeding with his unloading and loading operations.

The present invention overcomes the above-mentioned shortcomings of the prior art remote powdered detergent dispensers. The remote detergent dispenser of the present invention provides a safe and reliable method of producing highly concentrated detergent solutions for use by remotely located washing machines, produces solutions which are of substantially uniform composition and concentration throughout the conversion of the entire contents of the detergent holding container, and minimizes waste due to unusable residues remaining in the dispensing container. Further, the present invention incorporates built-in safety features which automatically protect an operator from hazardous highly caustic sprays during his unloading and loading of the apparatus.

SUMMARY OF THE INVENTION

The present invention is particularly suitable for converting powdered detergent from easy-to-handle 5 to 10 gallon containers into concentrated detergent solution for supplying a remotely located washing apparatus therewith. However, its principles can equally well be applied to use with larger powdered detergent shipping containers without departing from the spirit or intent of this invention. This invention generally includes a chassis defining a reservoir for holding the concentrated detergent solution produced from the powdered detergent, which chassis has an upper inlet port therethrough opening into the reservoir. The inlet port is shaped to correspond in size to the open end of the cylindrical detergent holding container.

Means are provided for rapidly positioning and holding the detergent bearing container in an inverted position overlying the chassis such that the open end of the container is cooperatively aligned with the inlet port to the reservoir. A continuous curved screen is interposed between the container and the reservoir, completely covering the open end of the container such that the screen projects into the mouth of the container and is convexly disposed relative to the inside thereof. The mesh of the screen is sized sufficiently small to prevent the powdered detergent from passing therethrough. Means are provided for retainably securing the screen member to the container for movement therewith, such that when the container is in inverted position, the powdered detergent therein is retainably held within the container by the screen member. Seal means are disposed around the periphery of the inlet port to the reservoir for forming a leakproof continuum between the reservoir and the inside of the container when the container is positioned in its operative inverted manner over the inlet port.

A single spray nozzle is mounted within the reservoir below the inlet port thereto and directs a spray which covers substantially the entire downwardly facing surface of the curved screen member. A pump connecting the reservoir sump with the nozzle, and responsive to energizing signals from the remotely located washing machine, periodically forces concentrated detergent solution from the reservoir through the nozzle, as a low-pressure spray against the screen. The spray uniformly hydrates that portion of the powdered detergent carried immediately above the screen member, dissolving a portion of the powdered detergent. The dissolved detergent passes as concentrated detergent solution downwardly through the mesh of the screen member and through the inlet port for collection within the underlying reservoir. Upon receipt of demand signals from the remotely located washing apparatus, the pump also supplies the remotely located washing apparatus with concentrated detergent solution from the reservoir as required. Sensing control apparatus maintains a predetermined volume of solution within the reservoir by sensing the solution level within the reservoir and by periodically adding fresh water to the reservoir to maintain the solution at a predetermined level.

The detergent dispensing apparatus includes safety control means automatically operative to prevent hazardous spray of the highly caustic detergent solution when a detergent container is not properly positioned above the inlet port to the reservoir for completely accepting such spray. The preferred embodiment of the invention includes dual safety features which require that the shipping container be properly positioned overlying the inlet port of the reservoir and that the container be retainably locked in such operative position prior to permitting energization of the pump for effecting a spray from the nozzle.

The nozzle is positioned below the screen member such that the solution spray directed therefrom impinges uniformly across the screen member in a direction generally perpendicular thereto, resulting in a uniform hydration of that powdered detergent within approximately one-half inch of the retaining screen. The uniform hydration under low-pressure spray minimizes caking of the detergent and virtually eliminates channeling therein. Also, the wetting of only that portion of the powdered detergent immediately adjacent the retaining screen member, minimizes decomposition of additives such as chlorine from the detergent mass, making the apparatus of this invention particularly attractive for use with such powdered detergent compositions. By directing a spray of detergent solution which is taken from the holding reservoir, the flushing action of the spray against the retained detergent significantly decreases variances in the concentration level of the detergent solution produced thereby and thus in the concentrated solution available for use by the remotely located washing machine.

While the present invention will be described in combination with shipping containers of the convenient 5 to 10 gallon size, it will be understood that the principles of this invention apply equally well to apparatus usable with larger detergent containers. Further while the preferred embodiment of the invention employs dual safety features directed to the container positioning and locking aspects of the apparatus, it will be understood that this invention is broad enough to encompass alternate techniques for achieving the automatic safety concepts of this invention. Also, while the invention will be described in conjuction with a specific electronic control module for activating the pump, it will be understood that other control circuits which are operative to produce demand output signals for energizing the pump can equally well be employed.

BRIEF DESCRIPTION OF THE DRAWING

Referring to the Drawing, wherein like numerals represent like parts throughout the several views:

FIG. 1 is a front elevational view of the detergent dispensing system of the present invention, with an alternate position of the detergent container and the locking handle safety feature being illustrated in dashed lines;

FIG. 2 is a side elevational view of the detergent dispensing system of the present invention disclosed in FIG. 1;

FIG. 3 is a fragmentary vertical sectional view of the dispensing system disclosed in FIG. 2 taken along the line 3—3 of FIG. 2, with an alternate position of the locking handle safety feature illustrated in dashed lines;

FIG. 4 is a vertical sectional view of the dispensing system of FIG. 2 taken along the line 4—4 of FIG. 2;

FIG. 5 is a vertical sectional view of the dispensing system of FIG. 1, taken along the line 5—5 of FIG. 1;

DESCRIPTION OF THE PREFERRED EMBODIMENT

Figure 6:
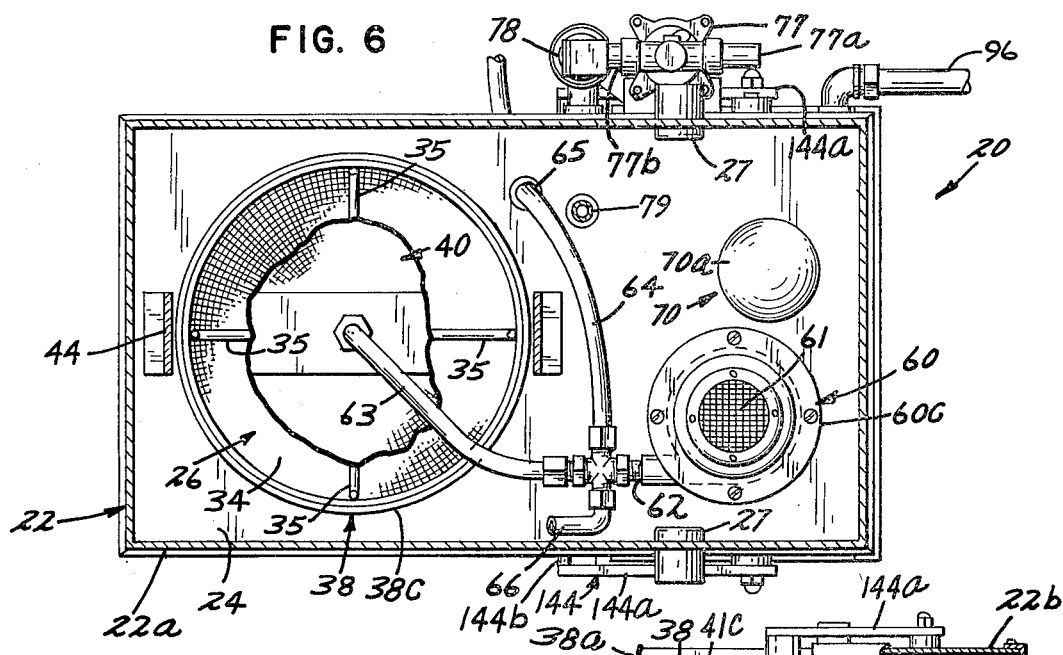
FIG. 6 is a horizontal sectional view of the dispensing system of FIG. 4 taken along the line 6—6 of FIG. 4, with portions thereof broken away.

Referring to the Figures, there is generally disclosed at 20 a powdered detergent dispensing system for supplying a remotely located washing apparatus (illustrated at 21 in FIG. 9) with concentrated detergent solution. The dispensing system has a chassis 22 characterized by a lower base portion 22a defining an internal reservoir 24 suitable for holding a predetermined volume of concentrated detergent solution.

Figures 4, 5:
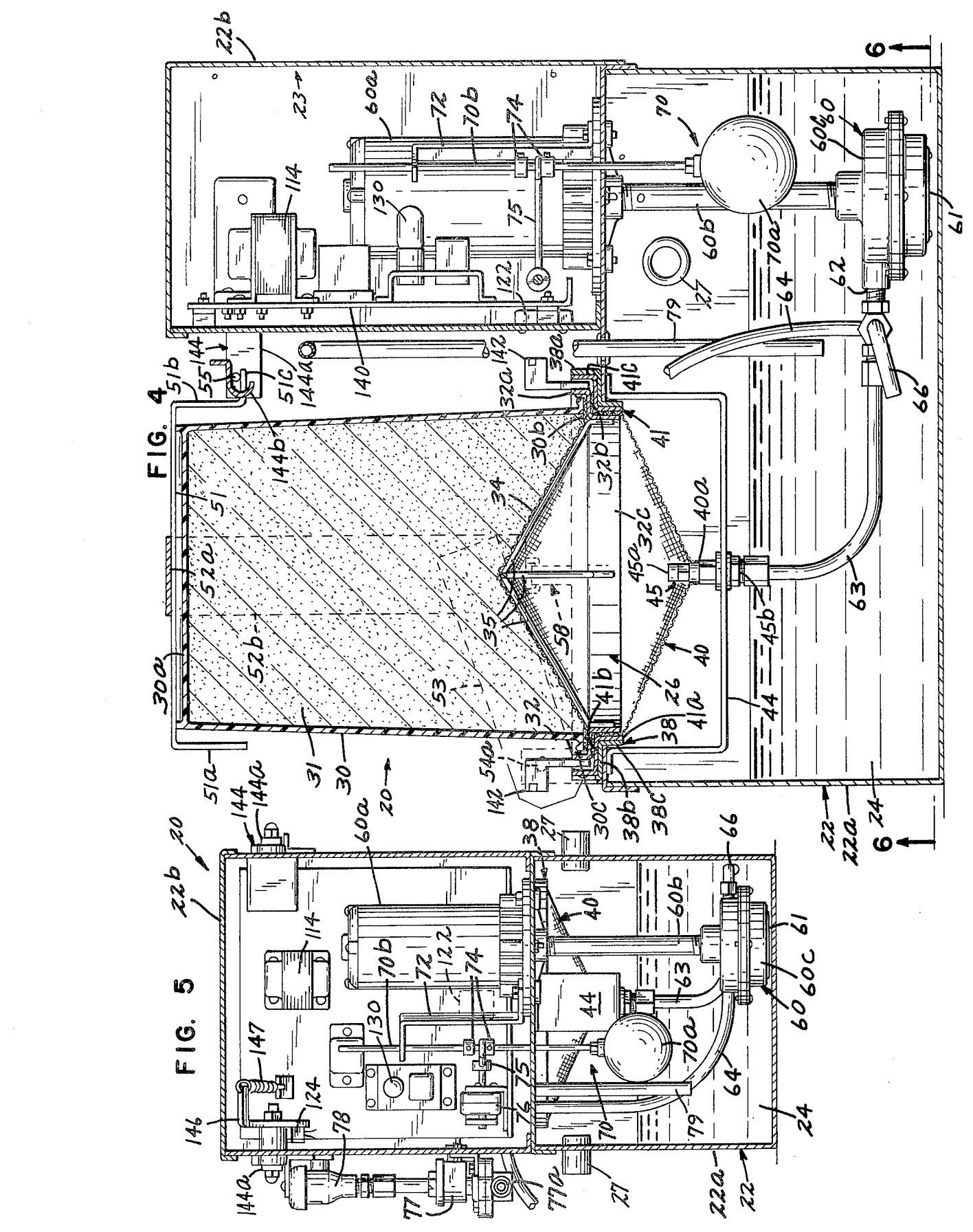

In the preferred embodiment, the chassis portion defining the reservoir 24 is constructed of stainless steel, however, it will be understood that the chassis portion 22a which defines the reservoir could equally well be lined with or molded as a single unit from a suitable plastic or other corrosion resistant material. The upper surface of the base portion 22a chassis 22 has an opening formed therethrough defining an inlet port 26 (see FIGS. 4 and 8) into the underlying reservoir 24.

A pair of overflow ports 27 are formed through the side walls of the base portion 22a of the chassis 22, opening into the reservoir 24, and provide outlet paths for solution from the reservoir should a malfunction of the system occur which would cause excess solution to accumulate in the reservoir. The chassis 22 further has an upper portion 22b for enclosing the electrical components of the invention, hereinafter described.

A shipping container or drum of generally cylindrical shape is illustrated at 30. The container 30 is suitable for carrying a quantity of powdered detergent 31, and has a closed end 30a, an oppositely disposed open end 30b suitable for accepting and discharging powdered detergent into and out of the container and a lip portion 30c circumferentially extending around the container at its open end 30b. As illustrated in FIG. 4, substantially the entire end 30b of the container 30 is open. In the preferred embodiment, the container has a capacity of approximately 5 to 10 gallons which make it easy to handle in rapid loading and unloading operations. However, the invention applies equally well to larger shipping containers.

The container 30 is illustrated in FIGS. 1, 2 and 4 as it would operatively appear in inverted manner over the inlet port 26 to the reservoir 24. The inlet port 26 is sized to cooperatively mate with the open end 30b of the container 30, as will become more apparent hereinafter.

A circular retainer ring member 32 is removably mounted to the container 30 at its open end 30b. The retainer ring 32, best illustrated in FIGS. 4 and 8, includes a cylindrical large-diameter portion 32a, a peripheral support flange portion 32b inwardly extending from the large-diameter portion 32a, and a smaller diameter cylindrical portion 32c. The upper surface of the flange portion 32b of the retainer ring 32 provides a planar support surface for the lip portion 30c circumferentially extending around the open end 30b of the container 30. The cylindrical portions 32a and 32c are concentrically mounted on the support flange portion 32b such that when the retainer ring member 32 is mounted to cooperatively engage the container 30 at its open end 30b, the circumferentially extending lip 30c of the container engages the support flange portion 32b of the retainer ring 32, and the large diameter portion 32a upwardly circumferentially extends around the lip portion 30c of the container 30, as illustrated in FIG. 4.

A curve screen member 34 is mounted to the retainer ring 32 and continuously extends thereacross so as to appear concave when viewed from the smaller diameter portion 32c of the retainer ring, see FIG. 4. The lower, circular edge portion of the screen member 34 is welded to the upper surface of the support flange portion 32b of the retainer ring 32 such that the lip portion 30c of the container 30 engagingly rests thereupon when the container 30 is operatively positioned over the inlet port 26 of the reservoir 24. A plurality of support rods 35 are secured to the inner periphery of the lower portion 32c of the retainer ring 32 and are shaped to engage the lower surface of the screen member 34 for providing mechanical support thereto. In the preferred embodiment, the screen member 34 is generally cone shaped with its apex lying along the longitudinal central axis of the retainer ring 32. Accordingly, in the preferred embodiment, the plurality of support rods 35 are also shaped in a generally conical arrangement, with their upper ends welded together along the longitudinal central axis of the retainer ring 32 to matingly accommodate the cone shaped configuration of the screen member 34. The mesh size of the screen member 34 is sufficiently small to prevent powdered detergent within the container 30 from passing therethrough. Therefore, when the detergent bearing container 30 is positioned in an inverted manner overlying the retainer ring 32 and attached screen member (34 and 35) assembly, as illustrated in FIG. 4, the screen member 34 as supported by the support rods 35 and retainer ring 32 prevents powdered detergent 31 from escaping through the open end 30b of the inverted container 30.

Figure 8:
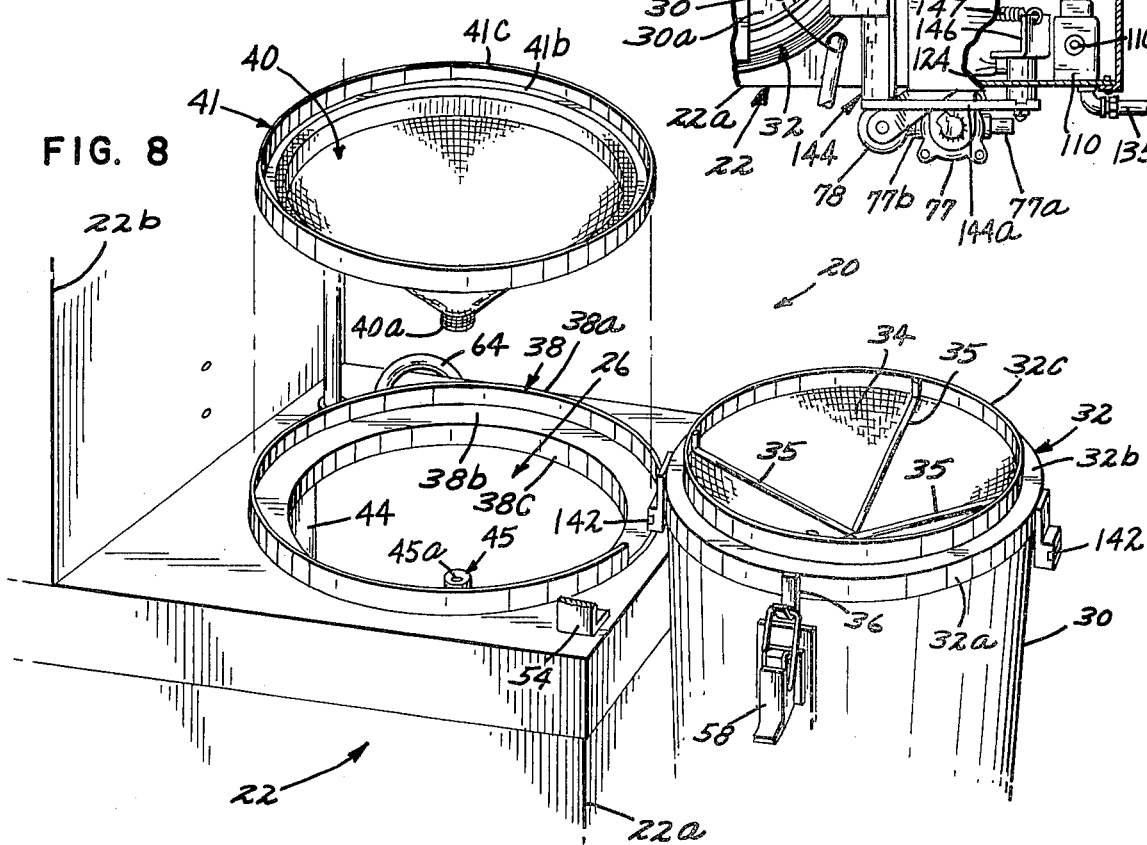
FIG. 8 is a fragmentary perspective view of the reservoir inlet port portion of the dispensing system of FIG. 1, illustrating the cooperative positional alignment of the first and second screen member assemblies relative to the inlet port.

A circular support ring member 38 is secured to the upper surface of the lower base portion 22a of the chassis 22 around the periphery of the inlet port 26 therethrough. The support ring member 38 includes a cylindrical large-diameter portion 38a, and inwardly extending peripheral support flange portion 38b and a smaller diameter cylindrical portion 38c. As illustrated in FIGS. 4 and 8, the cylindrical portions 38a and 38c of the support ring member 38 are concentrically mounted on the planar flange support portion 38b, with the large diameter cylindrical portion 38a upwardly extending from the flange support portion 38b to form a lip designed to prevent excess detergent powder or solution from dripping onto the floor during loading and unloading operations and when the system is operating. The small diameter cylindrical portion 38c of the support ring member 38 extends downwardly from the inner edge of the flange support portion 38b and defines the outer periphery of the inlet port 26 into the underlying reservoir 24. The inside diameter of the cylindrical portion 38a of the support ring member 38 is sized somewhat larger than the outside diameter of the cylindrical portion 32a of the retainer ring member 32 such that when the retainer ring member 32 and the support ring member 38 are coaxially aligned with one another, as illustrated in FIG. 4, the retainer ring member 32 cooperatively fits over the support ring member 38 with the lower planar surface of the flange portion 32b of the retainer ring 32 being disposed parallel to the upper planar surface of the flange support portion 38b of the support ring member 38.

A lower curved screen member 40 is removably mounted to the support ring member 38 at the inlet port 26 to the reservoir 24 as best illustrated in FIG. 8. In the preferred embodiment, the lower curved screen member 40 is generally cone shaped about the central axis of a mounting ring member 41, with its outer periphery edge secured thereto. The mounting ring member 41 has a downwardly extending cylindrical portion 41a to which the outer edge of the screen member is secured, a peripheral flange portion 41b and an upwardly extending larger diameter cylindrical portion 41c. The cylindrical and flange portions 41a–41c of the mounting ring member 41 are coaxially aligned with the support ring member 38 with the outer diameter of the cylindrical portion 41a of the mounting ring member 41 being slightly less than the inner diameter of the cylindrical portion 38c of the support ring member 38 to form a snug fit therewith. The lower curved screen member 40 is operatively supported upon the support ring member 38 by the mounting ring member 41 as illustrated in FIGS. 4 and 8 such that the lower planar surface of the peripheral flange portion 41b of the mounting ring member 41 uniformly engages the upper planar surface of the flange support portion 38b of the support ring member 38 and such that the mesh portion of the lower screen member 40 extends downwardly, in concave manner, with respect to the general plane of the support ring member 38. Except for a small circular opening 40a near the lower apex of the screen member 40, the mesh of the screen member 40 continuously covers the inlet port 26 to the reservoir 24.

The mesh size of the lower curved screen member 40 is sufficiently small to prevent the powdered detergent 31 from passing therethrough. Therefore, the lower curved screen member 40 is a safety screen which prevents accidental discharge of powered detergent through the inlet port 26 and into the underlying reservoir 24 should an operator accidently position a filled container 30 in inverted position overlying the inlet port without the presence of the retainer ring member 32 and attached upper screen support member 34.

A support bracket 44 is secured to the inner surface of the lower base portion 22a of the chassis 22 adjacent the peripheral edges of the inlet port 26 thereto and projects downwardly into the reservoir 24 below the inlet port 26 as illustrated in FIGS. 4 and 6. The bracket 44 supports a spray forming nozzle 45 below the inlet port 26 to the reservoir 24 and in coaxial alignment with the support ring member 38. The nozzle 45 has a spray forming discharge end 45a and an inlet port 45b. The circular opening 40a in the lower curved screen member 40 is sized to allow the upper portion of the nozzle 45 to project therethrough, as illustrated in FIG. 4, such that the lower curved screen member 40 does not interfere with the spray action of the nozzle 45, but snugly fits around the nozzle to cooperatively prevent therewith accidental discharge of powdered detergent into the underlying reservoir 24.

The container 30 is operatively positioned in inverted manner and in alignment with the inlet port 26 to the reservoir 24 by means of a cradle assembly generally designated at 50. The cradle assembly 50 includes an elongate support plate 51 welded transversely across an upper plate portion 52a of a U-shaped brace member 52 also having a pair of elongate spaced arm portions 52b downwardly depending from the ends of the upper plate portion 52a along opposite sides of the container 30. A pair of rocker arms 53 are each pivotally connected by means of an L-shaped hinge member 54 to the upper surface of the base portion 22a of the chassis 22, with the free end of each rocker arm 53 being welded to the lower end of one of the elongated spaced arm portions 52b of the U-shaped brace member 52. The hinge members 54 are secured in spaced relationship relative to one another near one longitudinal end of the base portion 22a of the chassis 22, each including a hinge pin 54a extending through the upper projection of the hinge member and through the lower end of that rocker arm 53 associated therewith. The spaced hinge pins 54a are axially aligned with one another, thus directing the pivotal motion of the rocker arms 53 thereabout in spaced parallel planes. The hinge members 54 are spaced relative to one another so as to permit the container 30 to be positioned between the spaced rocker arms 53 and the elongate spaced arm portions 52b of the U-shaped brace member 52 as illustrated in FIGS. 1, 2 and 4.

Figure 7:
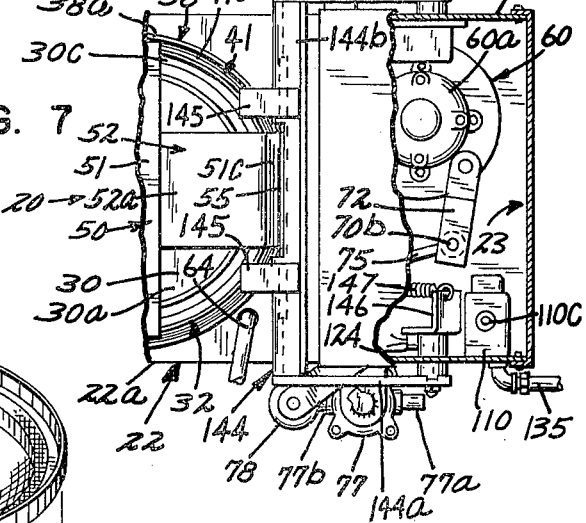
FIG. 7 is a fragmentary horizontal sectional view of the dispensing system of FIG. 1 taken along the line 7—7 of FIG. 1, with portions thereof broken away.

The elongate support plate 51 has a first projection 51a downwardly projecting from that end thereof which overlies the hinge members 54, and second projecting portion 51b downwardly projecting from that end of the elongate support plate 51 which lies adjacent the upper chassis portion 22b of the chassis 22. The lower end of the second downwardly projecting member 51b of the elongate support plate 51 is outwardly flanged at 51c and has a cylindrical bar member 55 welded thereto and transversely extending outwardly from both edges of the flange portion 51c (FIGS. 4 and 7). When the rocker arms 53 are rotated about the hinge pins 54a, the entire cradle assembly 50 rotates therewith from a loading position, illustrated in dashed lines in FIG. 1, to a fully inverted operative position as illustrated in full lines in FIG. 1. The hinge members 54 and the rocker arms 53 are positioned and sized respectively so as to allow the entire cradle assembly to clear the left end (as viewed in FIG. 1) of the base portion 22a of the chassis 22 when the cradle assembly is in its loading position. In this position a detergent container 30 can be rapidly loaded into the cradle assembly 50 such that the bottom (closed end) 30a of the container 30 engagingly rests upon support plate 51 and between the elongate spaced arm portions 52b of the U-shaped brace member 52 and the first and second projections 51a and 51b respectively of the elongate support plate 51. Further, the length of the hinges are sized such that the outer surface of the upper plate portion 52a of the U-shaped brace member 52 rests directly upon that surface which supports the chassis 22, as illustrated in FIG. 1, when the cradle assembly 50 is in its loading position.

Referring to FIGS. 1, 2 and 8, a pair of hook members 36 are welded to the upwardly projecting large diameter cylindrical portion 32a of the retainer ring member 32 at diametrically opposite sides thereof. The pair of hook members 36 cooperate with a pair of turnbuckle assemblies 58, one each of the turnbuckle assemblies being secured to the lower portion of each of the elongate arm projections 52b of the U-shaped brace members 52 adjacent its juncture with its respectively connected rocker arm 53. Each of the turnbuckle assemblies 58 is characterized by a pivotal handle 58a and an associated loop 58b.

A container 30 full of powdered detergent 31 is loaded into the detergent dispensing system 20 as follows. The cradle assembly 50 is pivoted to the dotted line loading position illustrated in FIG. 1. The container 30 is positioned into the cradle assembly 50 such that the closed end 30a of the container 30 engages the elongate support plate 51 of the cradle assembly, with the open end 30b of the container 30 facing upwardly. In this position, the pair of elongate spaced arm portions 52b of the U-shaped brace member 52 will extend upwardly along opposite sides of the container 30. The retainer ring member 32 is positioned over the open end 30b of the container 30 such that the surface of the flanged portion 32b of the retainer ring 32 rests in uniform engagement on the lip 30c of the container and such that the curved screen member 34 projects into the open end 30b of the container. The retainer ring member 32 is rotated about its central axis until the pair of hook members 36 secured thereto are cooperatively aligned one each with each of the turnbuckle assemblies 58 on the elongate arm portions 52b of the U-shaped brace member 52. When the handle 58a of each turnbuckle assembly 58 is released, the associated loop 58b can be readily placed over that hook member 36 aligned therewith. When the handles 58a of the turnbuckle assemblies 58 are subsequently closed in locked position, the leverage action of the turnbuckle assemblies 58 against the hook members 36 causes the flanged portion 32b of the retainer ring member 32 to be drawn into tight compressive engagement against the lip 30c of the container such that the container 30 becomes securely locked between the retainer ring member 32 and the elongate support plate 51 of the cradle assembly 50.

Once the container 30 is secured between the retainer ring member 32 and the elongate support plate 51, as shown in the dashed line position of FIG. 1, the cradle assembly 50 and secured container 30 are rotated in clockwise direction as viewed in FIG. 1, about the hinge pins 54a until the cradle assembly 50 reaches the inverted container position illustrated in full line in FIG. 1. In this position, the open end 30b of the container 30 is downwardly directed and is aligned with the inlet port 26 to the reservoir 24 such that the longitudinal axis of the container 30, of the retainer ring member 32, of the support ring member 38 and of the nozzle 45 are in coaxial alignment with one another. When the lower curves screen member 41 is in operative resting position against the support ring member 38, see FIGS. 4 and 8, the flanged portion 41b of the mounting ring member 41 of the curved screen member 40 is sandwiched between the bottom surface of the flanged portion 32b of the retainer ring member 32 and the upper surface of the flanged support portion 38b of the support ring member 38, forming a leak proof seal therebetween. The small-diameter cylindrical portion 32c of the retainer ring 32 projects downwardly into the reservoir 24 with the outer surface thereof engaging the cylindrical portion 41a of the mounting ring member 41 of the lower curved screen member 40. The upwardly projecting cylindrical portion 38a of the supporting ring member 38 not only functions to assist in guiding the loaded cradle assembly 50 into the proper position overlying the reservoir 24, but also acts to prevent any detergent solution from splashing out of the reservoir 24 and to prevent residue solution from dripping from the retainer ring member 32 or attached screen member 34, redirecting any such splash or residue into port 26 of the reservoir 24.

In the loading inverted position, the upper screen member 34 and support rods 35 support the entire weight of the powdered detergent 31 carried by the container 30. The mesh of the screen members 34 and 40 are sized to prevent the powdered detergent 31 from sifting therethrough. Different screen mesh sized, may, therefore, be utilized where necessary or desirable to accommodate powdered detergents of differing particle sizes.

For unloading the apparatus, the above procedure is reversed. A more detailed operation, with respect to the inclusion of safety features and their effect and operation relative to the loading and unloading operations will be hereinafter described. Due to the convenient size and relatively light weight of the 5 to 10 gallon detergent containers, the cradle assembly 50 can be rapidly manually rotated between its loading and its operative positions.

A pump assembly 60 is connected to the chassis 22 and provides the propelling force, as hereinafter described, for generation of the spray required to dissolve the powered detergent into concentrated detergent solution and for the desired fluid motion of the concentrated detergent solution within the dispensing system 20 and to remotely located washing apparatus. The pump assembly 60 has a motor head 60a mounted within the upper extension 22b of the chassis 22, a cylindrical column 60b downwardly depending from the motor head 60a into the reservoir 24 and terminating at a centrifugal pump head 60c. The cylindrical column 60b houses the shaft extension of the motor 60a which drives the impeller (not illustrated) within the pump head 60c which is normally submerged within the solution held within the reservoir 24.

Referring to FIGS. 4, 5, 6, and 9, the centrifugal pump head 60c has a screened intake port 61 adjacent to but spaced from the bottom of the reservoir 24, and a discharge port 62. The discharge port 62 is connected by means of a first conduit 63 in fluid communication with the inlet port 45b of the spray forming nozzle 45. A second conduit 64 is also connected in fluid communication with the outlet discharge port 62 of the centrifugal pump head 60c to direct a portion of the discharge therefrom to the remotely located washing machine 21. The second conduit 64 comprises, in the preferred embodiment, flexible hose which passes through an opening 65 in the upper surface of the base chassis portion 22a and extends outwardly therefrom to provide concentrated detergent solution discharge into the holding tank of the remotely located washing machine 21.

Figure 9:
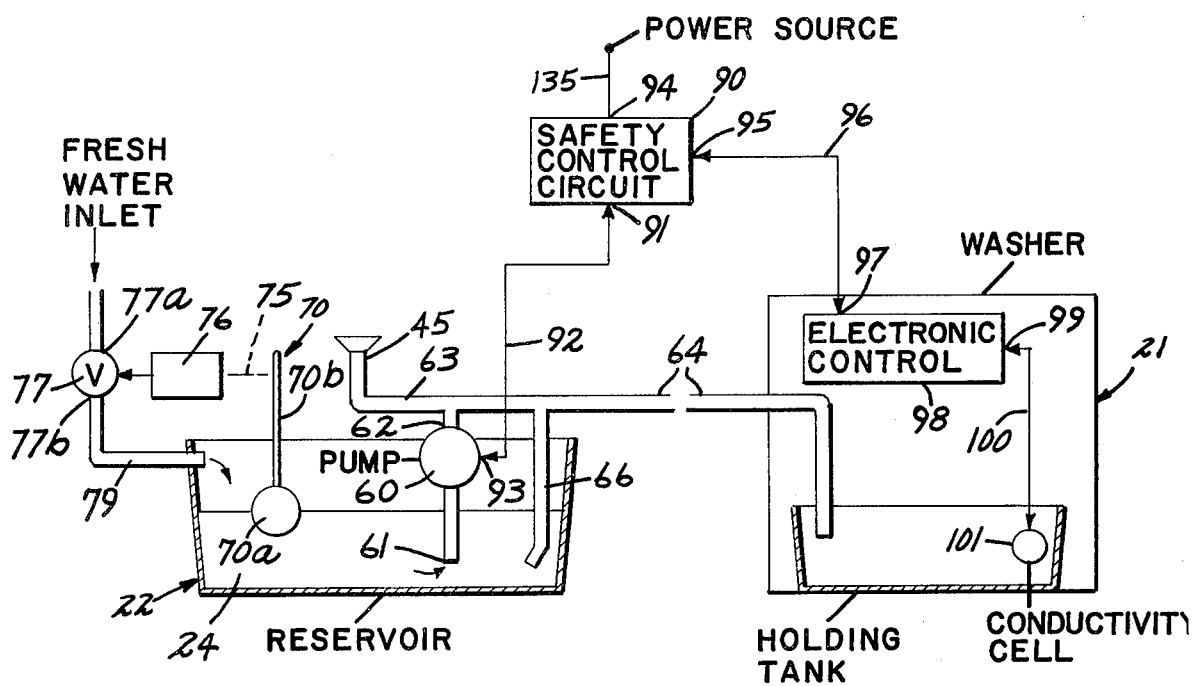
FIG. 9 is a schematic block diagram illustrating the circulatory and basic electrical signal flow paths of the dispensing system of this invention.

The general fluid flow path for concentrated detergent solution from the reservoir 24 which is provided by the pump assembly 60 is schematically illustrated in FIG. 9. The centrifugal pump head 60c further provides recirculating motion of the concentrated detergent solution within the reservoir 24 by means of a third conduit 66 connected in fluid communication with the discharge port 62 of the pump head 60c. The discharge end of the third conduit 66 terminates within the reservoir 24 and directs its fluid discharge in a direction so as to circulate the concentrated detergent solution within the reservoir to prevent the precipitation of detergent therefrom. Presettable baffles (not illustrated), insertable at the outlet port 62 of the pump head 60c or alternatively at the junctures of the first, second and third conduits 63, 64, and 66c respectively, proportionately control the rates of solution flow from the discharge port 62 through the respective conduits.

Referring to FIGS. 3 through 7 and 9, a float device, generally designated at 70, extends into the reservoir 24. The float inlcudes a ball member 70a adapted to float on the surface of a solution within the reservoir and a vertically extending support arm 70b. One end of the support arm 70b is secured to the ball member 70a and the free end thereof extends through a hole in the upper surface of base portion 22a of the chassis 22 and into the upper chassis portion 22b where it is slidably engaged by a bracket 72 which cooperates with the hole through the chassis to guide the vertical motion of th support arm 70b.

Figure 10:
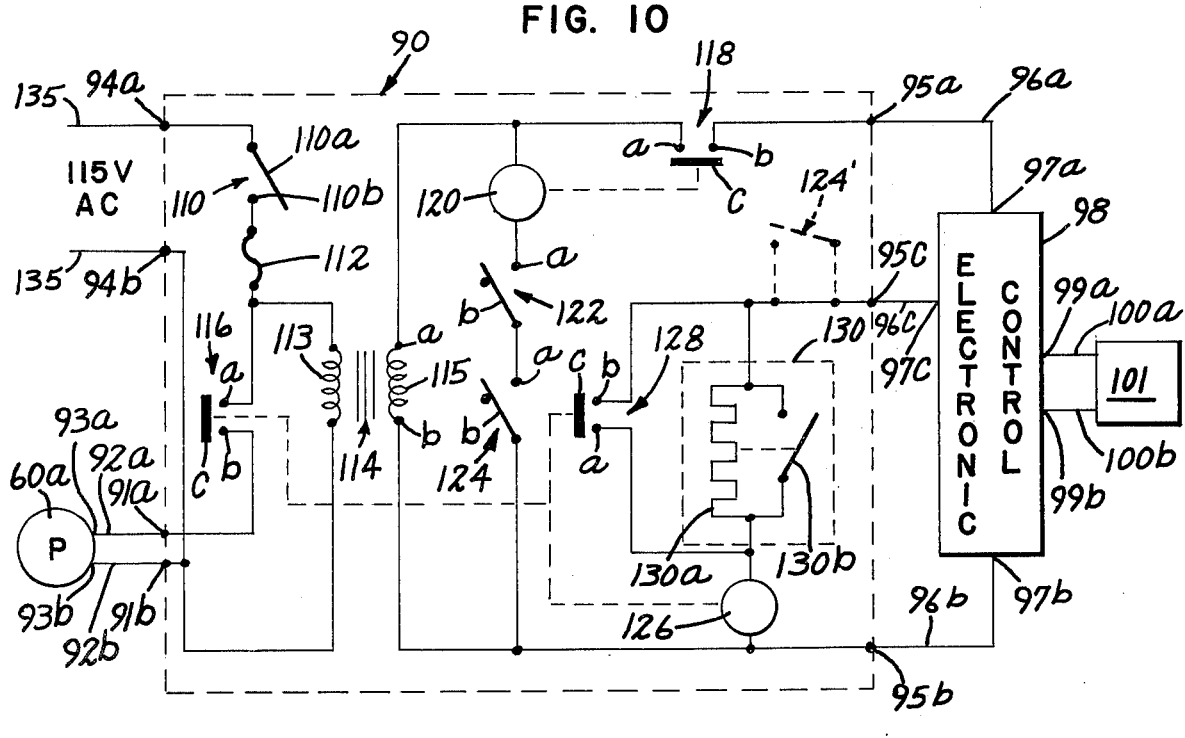
FIG. 10 is a schematic diagram of the electrical control portions of the dispensing system illustrated in FIG. 9.

A pair of collars 74 are adjustable mounted in vertically spaced relationship relative to one another to the support arm 70b of the float device 70. One end of the switch actuating arm 75 is slidably secured to the support arm 70b for motion therewith as restrained by the relative positioning of the pair of collars 74 along the support arm 70b. The opposite end of the switch actuating arm 75 is connected to activate the toggle arm of a normally open switch 76. The switch 76 is connected to control energization of a solenoid valve 77. The solenoid valve 77 has an inlet port 77a suitable for connection to a source of fresh water (not illustrated), and further has an outlet port 77b. The outlet port 77b of the solenoid valve 77 is connected in fluid communication by means of a siphon breaker 78 and a conduit 79 to provide a fresh water discharge into the reservoir 24.

Where not illustrated in the Figures, it will be understood that appropriate conductive interconnection between electrical components are provided and that appropriate power sources with their respective electrical connections to the electrical components are provided to render an operative system. Except for those conductive paths between the electrical switch 76 and its associated solenoid valve 77, the conductive paths between electrical components within the system are schematically illustrated in FIG. 10. The solenoid valve 77 is normally operative in a closed position to prevent fresh water from flowing therethrough and into the reservoir when the switch 76 is in a non-conductive (open) mode. When the switch 75 is toggled by means of the float device 70 to a conductive mode, the solenoid valve 77 is actuated to an open condition allowing fresh water to flow therethrough and into the reservoir 24. The pair of collars 74 are adjustable along the support arm 70b of the float device 70 to adjust the toggling actuation of the switch 76 to maintain any predetermined level of solution within the reservoir 24.

Referring to FIG. 9, the pump motor 60a is periodically energized by means of a safety control circuit 90. The safety control circuit 90 has a first signal output 91 connected by means of a signal flow path 92 to a control input 93 of the pump motor 60a. The safety control circuit also has a power supply input 94 energized through a power supply conduit 135 and a second signal output 95.

The second signal output 95 of the safety control circuit functional block 90 is connected by means of signal flow path 96 to a signal input 97 of an electronic control module 98. The electronic control module 98 further has a signal output 99 connected by means of a signal flow path 100 to a conductively cell 101 positioned within the holding tank of the remotely located washing apparatus 21 for sensing the conductively (i.e. the detergent concentration level) of the solution held therein. It will be understood that the designation of signal inputs and outputs and signal flow paths with reference to FIG. 9, are not intended to represent single ones of such terminals or conductors, but are merely intended to reflect the general path of signal flow between respective designated components of the block diagram. As will become apparent upon a more detailed description of the circuits of this invention, each signal flow path may in reality comprise a plurality of conductors, and each block diagram input and output designation may in reality comprise a plurality of physical terminal connection to the specified electronic component.

A schematic diagram of the electronic components comprising the safety control circuit 90 and associated electronic control module 98 is illustrated in FIG. 10. Referring thereto, it will be noted that those input and output terminals and conductors which collectively comprise an input or output or signal flow path designated in the block diagram of FIG. 9, are denoted by reference numerals of like designation followed by a lower case letter when more than one such physical terminal or conductor path is present. A 115 volt alternating current power supply (not illustrated) is operatively connected by means of the conduit 135 to energize the safety control circuit 90 through first and second power supply input terminals 94a and 94b respectively of the power supply input 94. The first power supply input terminal 94a is directly connected to a movable contact 110a of a safety interlock switch 110. The safety interlock switch further has a stationary contact 110b connected by means of a fuse 112 in series with a primary winding 113 of a transformer 114, to the second power supply input terminal 94b. The transformer 114 also has a secondary winding 115.

The stationary contact 110b of the safety interlock switch 110 is also connected by means of the fuse 112 and a first set of normally open relay contacts 116 to a first output terminal 91a of the first signal output 91 of the safety control circuit 90. The first output terminal 91a is directly connected by means of a conductor 92a to a first input terminal 93a of the pump motor 60a. The pump motor also has a second input terminal 93b directly connected by means of a conductor 92b to a second output terminal 91b of the safety control circuit 90. The second output terminal 91b of the safety control circuit 90 is directly connected to the reference supply input terminal 94b. The first set of normally open relay contacts 16 comprises a pair of stationary contacts 116a and 116b and a movable contact element 116c cooperatively movable relative to the stationary contacts 116a and 116b to open and close a conductive path between the stationary contact pair 116a and 116b.

A first terminal 115a of the secondary winding 115 of the transformer 114 is connected by means of a set of normally open relay contacts 118 to a signal input terminal 95a of the safety control circuit 90. The normally open relay contacts 118 comprise a pair of stationary contacts 118a and 118b and movable contact 118c cooperatively operable therewith to open and close the the conductive path between the stationary set of contacts 118a and 118b. The first terminal 115a of the secondary winding 115 of the transformer 114 is also connected by means of an energizing relay coil 120 to a stationary contact 122a of a first safety switch 122. The energizing coil 120 is connected to activate the set of relay contacts 118. The second terminal 115b of the secondary winding 115 of the transformer 114 is directly connected to a reference output terminal 95b of the safety control circuit 90.

The first safety switch 122 further has a movable contact 122b which is directly connected in series with a stationary contact 124a of a second safety switch 124. The second safety switch 124 further has a movable contact 124b which is directly connected to the reference output terminal 95b of the safety control circuit 90.

The reference output terminal 95b of the safety control circuit 90 is also connected by means of an energizing coil 126 and a set of normally open relay contacts 128 to a signal output terminal 95c of the safety control circuit 90. The relay contacts 128 comprise a pair of stationary contacts 128a and 128b and a movable contact 128c cooperatively movable with respect to the stationary contacts 128a and 128b to operatively open and close the conductive path therebetween. The energizing coil 126 is cooperatively aligned to simultaneously activate the sets of normally open relay contacts 116 and 128 as indicated by the dashed lines extending therebetween.

A time delay relay 130 is connected in series with the energizing coil 126 between the output terminals 95b and 95c of the safety control circuit 90. The time delay relay 130 schematically includes a heater element 130a and a normally open switching element 130b connected in parallel with one another. The switching element 130b is cooperatively operative with energization of the heater element 130a so as to electrically close a predetermined time interval following energization of the heater element 130a.

The signal output terminal 95a of the safety control circuit 90 is connected by means of a conductor 96a to a positive power supply input terminal 97a of the electronic control module 98. The electronic control module 98 further has a reference input terminal 97b directly connected by means of a conductor 96b to the reference output terminal 95b of the safety control circuit 90. The electronic control module 98 also has a signal output terminal 97c directly connected by means of a conductor 96c to the signal input terminal 95c of the safety control circuit 90. The electronic control module 98 further has a pair of signal input terminals 99a and 99b connected respectively by means of conductors 100a and 100b to the conductively measuring cell 101.

In the preferred embodiment, the electronic control module 98 is functionally identical to that of the electronic control network described in U.S. Pat. No. 3,680,070 to Marcus I. Nystuen, owned by the common assignee of this invention. In general, the electronic control module 98 is normally operable to provide a de-energiaing signal output at its output terminal 96c when the conductivity cell 101 indicates that the conductivity (i.e. the detergent concentration level) of the detergent solution within the washer holding tank is at or above a predetermined level, and is operable to produce an energizing output signal at its output terminal 97c whenever the conductivity cell 101 indicates that the conductivity (concentration level) of the solution within the holding tank has dropped below a predetermined minimum level. In the Nystuen patent disclosure, the signal output appearing at terminal 97c of the electronic control module is used to energize a solenoid valve; however, as pointed out therein, the signal output of the electronic control module 98 could equally well be employed to control other electronic circuits such as those disclosed in this invention.

The conductivity cell 101 may be any type of such cell well known in the art which provides an electrical output signal which varies in response to the electrical conductivity of the solution in which it is immersed.

The electrical components just described, which comprise the safety control circuits 90 are housed within the upper enclosed portion 22b of the chassis 22 and are primarily physically secured to a mounting plate 140 which is secured in spaced relationship to the forward wall of the upper part of the chassis 22b . The mounting plate 40 provides a stable mounting base for minimizing vibration to the electrical components and also acts as a heat sink for the components. The rear and upper wall portions of the upper chassis 22b are formed of a single piece of material, generally designated as 23 which is removably attachable to the sidewall portions of the upper chassis 22b. The panel 23 forming the rear and top wall portions may be removed for servicing of the electronic and electromechanic components housed within the upper chassis 22b.

The safety interlock switch 110 is mounted to a side wall of the upper chassis 22b and is positioned such that its toggle arm 110c is depressed when the removable service panel 23 is securely positioned to the upper chassis 22b so as to enclose the electrical components therein. The toggle arm 110c of the safety interlock switch 110 is spring biased and is operatively connected tot he movable contact 110a of the switch 110. When the panel 23 is in secured position as illustrated in FIG. 3, the toggle arm 110c of the switch 110 is depressed, thus electrically closing the switch 110 and enabling energization of the safety control circuits 90 and the electronic control module 98. When the protective panel 23 is removed from the chassis 22b for servicing or the like, the toggle arm 110c of the switch 110 acts under bias of its associated spring to electrically open the safety interlock switch 110, thus electrically safing the circuits of the powdered detergent system 20.

The electronic control module 98 is physically located at the situs of the remotely located washing machine, and electrical communication is established between the safety control circuits 90 within the powdered detergent dispenser system 20 and electronic control module 98 by means of the conductors 96a-96c which are housed within the signal flow path conduit 96, (illustrated in FIG. 1).

It should be noted that except where specifically pointed out with respect to safety switches such as the safety interlock switch 110 and the first and second safety switches 122 and 124 respectively, no particular significance is placed upon the location of the electronic components within the upper chassis 22b or their positioning upon the mounting plate 140, the figures being provided for merely illustrating a possible orientation of such components within the chasis. Also, electrical connectors and conductors are not illustrated in the FIGS. 1 through 8; however, it will be understood that such appropriate connectors and conductors as are required to complete the circuits as disclosed in the schematic diagrams of FIGS. 9 and 10 are present.

A pair of magnetic actuator members 142 are secured to the large diameter cylindrical portion 32a of the retainer ring 32 at diameterically opposite ends therof at positions circumferentially positioned therealong spaced 90° from the hook members 36 also secured thereto. In such position, when the cradle assembly 50 is operatively positioned in the "ready" position as illustrated in FIG. 4, one of the magnetic actuator members 142 is always positioned in close confronting proximity with the forward wall of the upper chassis portion 22b. The first safety switch 122 is mounted to the back side of the mounting plate 140 (FIGS. 4 and 5) at a position so as to confrontingly address the magnetic actuator member 142 when the cradle assembly 50 is positioned as illustrated in FIGS. 4. The first safety switch 122 is magnetically activated switch, which is normally operable in an electrically open mode in the absence of toggling thereby by a magnetic field, and operatively switches to a conducting mode only when one of the magnetic actuator members 142 is positioned as illustrated in FIG. 4, thus indicating that the container 30 is operatively positioned overlying the inlet port 26 to the reservoir 24. Two of the magnetic actuator members 142 are provided so that the retainer ring assembly 32 is a symmetrical and can be rapidly operatively positioned in either of two positions (rotated 180° from one another) upon the container 30.

A locking safety lever assembly generally designated at 144 (FIG. 1) includes a pair of rocker arms 144a pivotally connected to the side portions of the upper chassis 22b and a connecting arm 144b securing the rocker arms 144a together for uniform pivotal motion. The connecting arm 144b has a pair of flat handle tabs 145 (FIG. 7) connected to the upper surface thereof, one each of the tabs 144 being disposed to project on one side of the elongate support plate 51 when the cradle assembly 50 is in its operative ready position as illustrated in full-time FIG. 1. The lower portion of the connecting arm 144b is arcuately shaped (see FIG. 4) so as to lockingly engage the cylindrical bar 55 which is secured to the support plate 51 when the cradle assembly 50 is in its ready position as illustrated in FIG. 4. When the locking safety lever assembly 144 is downwardly positioned as illustrated in full-line in FIG. 1, and as in FIG. 4, the arcuately shaped portion of the connecting arm 144b prevents the cradle assembly 50 from being rotated in counterclockwise direction to its loading position by retainably engaging the cylindrical bar 55 on the support plate 51.

The locking safety lever assembly 144 includes a bracket 146 within the upper chassis portion 22b mounted for pivotal motion with the external rocker arm 144a, see FIGS. 3, 5 and 7. A spring member 147 is connected between the mounting plate 140 and the bracket 146 to bias the locking lever assembly 144 toward its downward or locked position, illustrated in full-lines in FIGS. 1 and 3. Therefore, once the locking lever is positioned in its locked (full-line) position, the spring member 147 acts to exert forces thereon which tend to maintain the safety lever 144 in its locked position.

The second safety switch 124 is mounted to the bracket 146 for rotation therewith. In the preferred embodiment, the second safety switch 124 is a mercury switch wherein the movable contact 122b comprises mercury which completes the electrical connection to provide electrical conduction through the switch. The switch 124 is operative in a non-conducting mode when the locking lever assembly 144 is positioned in its raised, unlocked position, illustrated in dashed lines in FIG. 1, and is operative in a conducting mode when the locking lever assembly 144 is positioned in its downward, locked position as illustrated in full-line in FIG. 1.

OPERATION OF THE PREFERRED EMBODIMENT

The Operation of the system is as follows. A fresh container of powdered detergent 30 is loaded into the dispensing system, as previously described, in its inverted operative position as illustrated in FIGS. 1, 2 and 4. When the container 30 has been operatively positioned over the inlet port 26 of the reservoir 24, that one of the magnetic actuator members 142 which is aligned in close proximity with the upper chassis portion 22b will energize the first safety switch 122 of the safety control circuit 90 to its closed mode of operation. The operator loading the system next rotates the locking safety lever assembly 144 downwardly in the counterclockwise direction as viewed in FIGS. 1 and 4 until the arcuate lower portion of the connecting arm 144b of the locking safety lever assembly 144 lockingly engages the cylindrical bar 55 of the elongate support plate 51. When the locking safety lever assembly 144 is positioned in its lowermost locked position, the second safety switch 124 of the safety control circuit 90 electrically closes completing the energization path for the relay 20, see FIG. 10. The first and second safety switches 122 and 124 are respectively magnetically and mechanicallly operative so as to be independent of the application of electrical power to the safety control circuits 90.

Referring to FIGS. 9 and 10, the safety control circuits 90 of that preferred embodiment designated therein, are energized by means of an AC voltage applied between the terminals 94a and 94b. Whenever the outer top and back panel assembly 23 of the upper chassis portion 22b is operatively secured to the chassis so as to prevent operator access to the electrical components of the safety control circuit 90, the safety interlock switch 110 is electrically closed, enabling energization of the primary winding 114 of the transformer 114 by means of the fuse 112. The normally open set of relay contacts 116 prevents energization of the pump motor 60a. The energized primary winding 113 induces an AC signal, approximately of 24 volts in the preferred embodiment, in the secondary winding 115 of the transformer 113, energizing the relay coil 120 through the electrically closed first and second safety switches 122 and 124. It wil be noted that since the safety switches 122 and 124 are connected in series in this embodiment, should either the locking safety lever assembly 144 not be positioned in its locked position or should one of the magnetic actuator members 141 not be positioned so as to activate the first safety switch 122 (i.e. signifying that the container is not properely positioned over the inlet port 126), a circuit path will not be completed through the relay coil 120, thus disabling the pump activating circuit portions of the safety control circuit 90.

The energized relay coil 20 electrically closes its associated relay contact pair 118, completing an energizing circuit path to the electronic control module circuits 98. A ground return path is provided for the electronic control module circuits 98 by means of the outlet port 97b, conductor 96b, the inlet port 95b and the common conductor lead to the second terminal 115b of the secondary winding 115. The electronic control module control circuits 98 operate as described in the Nystuen U.S. Pat. No. 3,680,070 basically as follows. When energized by means of the closed relay contacts 118, the control module circuits 98 are responsive to conductively sensing signals of the conductivity cell 101. The conductivity cell 101 is disposed within the holding tank of the remotely located washer 21 to provide an output signal indication of the detergent concentration level of the solution within the washer's holding tank. As the washer operates through its various washing cycles, the detergent concentration level of the solution within the holding tank will periodically decrease as the solution is diluted or lost, causing the electrical conductivity of the solution to decrease. The conductivity cell 101 senses the decreases electrical conductivity of the solution and electrically informs the electronic control module 98 of the decreased concentration level. The electronic control module 98 is normally operative to produce a logically low signal at its output terminal 97c which is insufficient to cause activating current flow through the time delay relay 130. Upon receipt of a low conductivity sensed signal from the conductivity cell 101, the electronic control module 98 responds to produce a logically high signal at its output terminal 97c which causes restricted current flow through the heater element 130a of the time delay relay 130. The initial current flow through the relay 130, however, is insufficient to energize the relay coil 126. After a predetermined time interval of continuous energization of the heater element 130a of the time delay relay 130, the contact element 130b of the relay 130 closes causing substantial energizing current to flow through the relay coil 126.

When energized, the relay coil 126 closes its first and second pairs of relay contacts 116 and 128 respectively. The closed contact pair 128 acts as a holding circuit for maintaining energization of the relay coil 126 and enables the time delay relay 130 to recycle itself through cooling of its heater element 130a. It will be understood that the heater element (130a) and associated switching contact (130b) representation of the delay relay 130 illustrated in FIG. 10, is schematical only. Upon closing of the first relay contact pair 116, the pump motor 60a is energized.

When energized, the pump motor 60a activates the pump assembly 60 to draw detergent solution from the reservoir 24 into its intake port 61 and to eject a portion of the solution by means of the first conduit 63 through the sprayforming nozzle 45. A portion of the solution is recirculated back into the reservoir via the third conduit 66 for stirring up the residue solution therein, and another portion of the solution is forwarded by means of the conduit 64 to the holding tank of the remotely located washer 21. When the conductivity cell 101 again indicates that the detergent concentration level within the holding tank has resumed its predetermined value, its sensors will electrically respond to indicate this fact to the electronic control module circuits 98. The electronic control module 98 will in turn respond by producing a logically low signal at its output terminal 97c, thus deenergizing the relay coil 126, which de-energization will cause the first and second relay contact pairs 116 and 128 to resume their normally open modes of operation, thus deenergizing the pump motor 60a.

Baffles (not illustrated) within the outlet port 62 of the pump 60 and the conduits 63, 64 and 66 leading therefrom are preset to regulate the respective proportions of solution flowing through the respective conduits. That portion of the solution supplied by means of the conduit 63 to the spray nozzle 45 is directed as a spray by the discharge end 45a thereof against the entire downwardly facing concave surface of the curved screen member 34. In the preferred embodiment, the solution spray ejected from the nozzle 45 is of low-pressure and just passes through the mesh of the screen 34 to hydrate only approximately one-half inch of that powdered detergent directly overlying the screen 34. A portion of this hydrated detergent passes into solution and drops through the mesh of the screen 34, through the underlying safety screen member 40 and into the reservoir 24.

The screen member 34 and the nozzle 45 are cooperatively positioned relative to one another such that the solution spray from the nozzle 45 impinges generally perpendicularly to the mesh of the screen 34 at all points therover. This is achieved in the preferred embodiment by use of a conical screen, which comes reasonably close to attaining the perpendicular impingement objective and is also easier and less expensive to fabricate than the ideally hemispherical screen member which would produce ideal results. In the preferred embodiment, the spray pressure of the solution ejected from the nozzle 45 is approximately 30 to 40 p.s.i. Lower pressures are preferable to reduce any channeling into the detergent mass 31 overlying the screen 34.

As a portion of the detergent solution is pumped from the reservoir 24 to the holding tank of the washer 21, the solution level within the reservoir 24 drops, causing the float device 70 to be vertically lowered in response, When the float 70 reaches a predetermined lower threshold level, the switch actuating arm 75 connected thereto electrically closes the switch 76, energizing the solenoid valve 77 to open the path for fresh water into the reservoir 24 by means of the conduit 79. As water is added to the reservoir the float device 70 rises until a maximum threshold level is reached, indicating that a proper solution level has been reattained within the reservoir 24. At that point, the switch actuating arm 75 connected to the float device will retoggle the switch 76 to an electrically open position, thus causing the solenoid valve 77 to resume its normally closed position, blocking fresh water inflow to the reservoir 24.

An alarm system (not illustrated) can be connected with either the reservoir of the detergent dispensing system or with the electronic control module 98 conductivity cell 101 combination of the washer to indicate when the powdered detergent within the shiping container 30 has been exhausted. When such an alarm occurs, an operator can rapidly replace the spent contaninter 30 with a loaded container with no threat of harm to his face or eyes from the highly caustic detergent solution being sprayed from the nozzle 45. The operator simply lifts the locking safety lever assembly 144 out of locking engagement with the cylindrical bar 55 (in the clockwise direction as viewed in FIGS. 1 and 4), thus electrically opening the second safety switch 124 and de-energizing the relay coil 120 to disable the electronic control module circuits 98 which control the energization of the pump motor 60a. The locking lever assembly 144 is designed such that before an operator can physically pivot an inverted container 30 away from the inlet port 26 by means of the cradle assembly 50, he must completely pivot the locking safety lever assembly 144 out of the path of the advancing cradle assembly movement. The small fraction of time that is required for the operator to physically lift and to pivot the locking safety lever assembly 144 enables sufficient time for the safety switch 124 to disable the electronic circuits and the pump motor 60a and accounts for that lag-time required to stop the inertia of the pumping action of the pump assembly 60. This required safety time period is on the order of about a second. Thus, by the time the operator, even when working at his fastest pace, is enabled to rotate the spent container from its position overlying the inlet port 26, he is assured that no hazardous solution will be coming from the nozzle 45. This safety feature is particularly important in such systems as herein disclosed where the hydrating solution being sprayed from the nozzle is of a highly caustic content which could be severely damaging to the face of an operator.

The retainer ring member 32, the circular support ring member 38 and the mounting ring member 41 are designed for coaxial alignment relative to the inlet port 26 to the reservoir 24 with the cradle assembly 50 being designed such that the retainer ring member 32 is rapidly pivotally positionable in overlying engagement with the mounting ring member 41 without binding or interfering with either the ring member 41 or the support ring member 38. Further, the mounting ring member 41 and attached safety screen member 40 can be removed from the assembly without affecting the operation or safety mechanisms of the invention.

It will be understood that alternate configurations of the electronic circuitry can be devised by those skilled in the art. For example, a second schematic configuration utilizing the dual safety switch principle could be configured by moving the safety switch 124 from its series connected position with switch 122 to connection with the terminal 95c, as illustrated at 124' in dashed lines in FIG. 10. It will be readily understood that in such an alternate embodiment, the movable contact 122b of safety switch 122 is directly connected to the reference lead of the safety control circuit 90 and that the safety switch now positioned at 124' selectively opens and closes the circuit path between the terminal 95c and the delay relay element 130.

Since the safety switch 124' is directly activated by the position of the safety assembly 144, if an operator inadvertently fails to "lock" the safety assembly 144 after positioning a loaded container in operative inverted manner over the inlet port to the reservoir, the open switch 124' will prevent the signal output from the electronic control module 98 from energizing the pump 60a, by directly preventing energization of the relay coil 126. Therefore, a visual/audio signal alarm (not illustrated) which warns of an "empty-container" will be activated since the effect of blocking energization of the pump 60a will be that the detergent concentration level within the holding tank of the washing apparatus will not "catch-up" to its present concentration level. This will force the operator to always properly position the safety apparatus 144 in its locked position before the pump 60a can be energized.

Other modifications of the invention will be apparent to those skilled in the art in light of the foregoing description. This description is intended to provide concrete examples of an individual embodiment clearly disclosing the present invention. Accordingly, the invention is not limited to this embodiment or to the use of specific elements therein. All alternative, modifications and variations of the present invention which fall within the spirit and broad scope of the appended claims are covered.

What is claimed is:

1. A remote powdered detergent dispenser of the type which produces a concentrated detergent solution from powdered detergent within a container for supplying a remotely located washing machine therewith, comprising:

a. a chassis defining a reservoir, said chassis having an upper inlet port opening into said reservoir;

b. a continuous curved screen member overlying and completely covering said inlet port, said curved screen member being shaped to present a downwardly facing concave surface with respect to the underlying reservoir and having a mesh sized to prevent powdered detergent from passing therethrough;

c. means for positioning and for holding a powdered detergent bearing container in an inverted position in overlying engagment with said curved screen member such that said screen member projects into the mouth of the container and is convexly disposed relative to the inside of the container for supportingly engaging the powdered detergent in the container;

d. seal means cooperatively engaging the container and said chassis for forming a leakproof seal therebetween when the container is in operative position overlying the inlet port to said reservoir;

e. spray means for converting the powdered detergent to a detergent solution, comprising:

i. a single nozzle mounted at said inlet port to said reservoir and disposed generally below the center of said curved screen member for directing a uniform spray at substantially the entire downwardly facing concave surface of said screen member to dissolve that portion of the powdered detergent being carried immediately above said screen, whereby the dissolved detergent passes in solution through the screen and is collected by said underlying reservoir; and ii. a pump connecting said reservoir and said nozzle, operative when energized to generate said spray by forcing solution from the reservoir through said nozzle;

f. spray control means operatively connected with said spray means for selectively energizing said pump so as to maintain within said reservoir a predetermined volume of said detergent solution; and g. safety control means for selectively blocking energization of said pump, said safety control means being operative to prevent the spray of said solution through said nozzle whenever the container is not operatively positioned over said inlet port.

2. A remote powdered detergent dispenser as recited in claim 1, wherein said curved screen member is generally cone shaped having its vertex disposed upwardly in the vertical direction away from said reservoir and projecting into the mouth of the powdered detergent bearing container; and wherein said holding means includes means for removably securing said screen to the container at its mouth for movement therewith as defined by said positioning means.

3. A remote powdered detergent dispenser as recited in claim 2, wherein said positioning means includes means for pivotally mounting the container to said chassis for movement between first and second positions, whereby the container is disposed in an upright manner with its mouth removed from said inlet port when positioned in said first position and is disposed in said operative inverted position with is mouth cooperatively overlying said inlet port when positioned in said second position.

4. A remote powdered detergent dispenser as recited in claim 1, wherein said safety control means comprises a first safety switching means responsive to the position of the container relative to said inlet port of said reservoir, for sellectively blocking energization of said pump, said first safety switching means being operable in a first switching mode when the container is not operatively positioned overlying said inlet port to said reservoir to de-energize said pump, thus preventing solution spray through said nozzle, and being operable in a second switching mode when the container is operatively positioned overlying said inlet port to said reservoir to electrically enable energization of said pump.

5. A remote powdered detergent dispenser as recited in claim 1, including locking means for securely locking the container to said chassis in its inverted operative position overlying said inlet port to said reservoir.

6. A remote powdered detergent dispenser as recited in claim 5, wherein said safety control means comprises first safety switching means responsive to said locking means for selectively blocking energization of said pump, said first safety switching means being operable in a first switching mode to de-energize said pump whenever said locking means is not positioned so as to operatively lock the container to said chassis, and being operable in a second switching mode to electrically enable energization of said pump whenever said locking means is positioned so as to securely lock the container to said chassis.

7. A remote powdered detergent dispenser as recited in claim 6 wherein said locking means comprises a first locking lever connected to said chassis for selectively controlling movement of the container relative to said chassis, said first locking lever being positonable in an unlocked position to enable free movement of the container relative to said chassis and being movable to a locked position to prevent movement of the container away from its said operative inverted position overlying said inlet port to said reservoir; and wherein said first safety switching means is connected to sense the motion of said first locking lever between its said unlocked and locked positions, and is operative in its said first switching mode when said locking lever is positioned in its said unlocked position, and is operative in its said second switching mode when said locking lever is positioned in its said locked position.

8. A remote powdered detergent dispenser as recited in claim 6, wherein said safety control means further includes second safety switching means responsive to the position of the container relative to said inlet port of said reservoir, for selectively locking energization of said pump, said second safety switching means being operable in a first switching mode when the container is not operatively positoned overlying said inlet port to said reservoir to de-energize said pump, thus preventing solution spray through said nozzle, and being operable in a second switching mode when the container is operatively positioned overlying said inlet port to said reservoir to electrically enable energization of said pump.

9. A remote powdered detergent dispenser as recited in claim 8, wherein said pump is energized by an energizing circuit path comprising said first and second safety switching means connected in electrical series as part thereof, wherein said first and said second safety switching means are operable to prevent energization of said pump whenever either of said first and said second safety switching means is operative in its respective said first mode.

10. A remote powdered detergent dispenser as recited in claim 1, further including:

a. means operatively connected with said reservoir for removing said concentrated solution therefrom to supply a remotely located washing machine with the solution; and b. means operatively connected to add water to said reservoir solution for maintaining a predetermined volume of said solution within said reservoir.

11. In combination with powdered detergent dispenser apparatus of the type having a chassis defining a reservoir for collecting a supply of concentrated detergent solution to be drawn for use by remote equipment; a container for powdered detergent having an open mouth and operatively disposed in inverted manner with its mouth overlying the reservoir; a curved screen member mounted to continuously extend across the container mouth for supporting powdered detergent in the container overlying the reservoir and defining a downwardly facing curved surface; spray means disposed below the curved screen member suitable for forming a spray from received fluid flow and for directing the spray at substantially the entire downwardly facing surface of the screen member, thus dissolving a portion of the powdered detergent carried thereby, which passes in solution through the screen and is collected within the reservoir; the improvement being characterized by improved control means operatively connected for selectively controlling the spray of fluid by said spray means, comprising:
 a. first fluid control means for periodically supplying said spray means with a flow of solution from the reservoir for causing a low-pressure spray to be formed therefrom which is directed against the downwardly facing surface of the curved screen member, for maintaining the detergent concentration level of the solution in the reservoir within a predetermined range; and
 b. safety control means responsive to positioning of the container relative to said underlying spray means for preventing spray of said solution from the spray means whenever the container is not positioned so as to completely intercept the produced solution spray.

12. The apparatus as recited in claim 11, wherein the chassis defines an inlet port overlying and opening into the reservoir, and wherein said safety control means further comprises:
 a. locking means mounted to engage the container for securely locking the container in its operative inverted position overlying said inlet port, said locking means being operable in an unlocked position to enable free movement of the container relative to said inlet port, and being operable in a locked position to immovably secure the container in its operative position overlying said inlet port; and
 b. safety switching means responsive to movement of said locking means for selectively blocking spray of said solution from the spray means, said safety switching means being operative in a first mode to block said solution spray from the spray means whenever said locking means is operatively positioned in its unlocked position, and being operable in a second mode to enable said solution spray from the spray means whenever said locking means is operatively positioned in its said locked position.

13. The apparatus as recited in claim 11, wherein the chassis defines an inlet port overlying and opening into the reservoir; and wherein the improvement is further characterized by:
 a. means cooperative with the curved screen member for forming a leakproof continuum between the reservoir and the inside of the container when the container is operatively positioned in inverted manner overlying said inlet port; and
 b. said safety control means further comprising:
  i. a first triggering element connectable for movement with the container; and
  ii. first safety switching means fixedly mounted to the chassis for sensing the position of said first triggering element relative thereto and being responsive to said sensed position for selectively blocking said flow of solution to said spray means, said first safety switching means being operable in a first mode to block flow of said solution to said spray means whenever the positioning of said first triggering element relative to said first safety switching means indicates that the container is not operatively positioned in inverted manner overlying said inlet port, and being operable in a second mode to enable flow of said solution to the spray means whenever the relative position of said first triggering element indicates operative inverted alignment of the container overlying said inlet port.

14. The apparatus as recited in claim 13, further including means for mounting said first triggering element to said container in predetermined position adjacent the mouth thereof; and wherein said first safety switching means includes a sensing element mounted to the chassis adjacent said inlet port and in cooperative sensing alignment with said first triggering element, said first triggering element and said sensing element being cooperatively operable when in close proximity to one another to cause said first safety switching means to become operable in its said second mode, and being inoperable when not in close proximity to one another to cause said first safety switching means to become inoperable in its said first mode.

15. The apparatus as recited in claim 14, wherein said sensing element of said first safety switching means comprises a magnetically responsive sensor for activating said first safety switching means between its said first and said second modes, and wherein said first triggering means comprises a magnetic element.

16. The apparatus as recited in claim 11, wherein the chassis defines an inlet port overlying and opening into the reservoir; and wherein the improvement is further characterized by:
 a. positioning means connected to the chassis for accurately positioning the container in operative inverted alignment overlying said inlet port; and
 b. said safety control means further comprising:
  i. a first triggering element connected to said positioning means and movable therewith to one resting position adjacent said inlet port whenever the container is placed by said positioning means to overlie said inlet port in inverted operative position relative to the spray means; and
  ii. first safety switching means mounted to the chassis adjacent said inlet port and in cooperative sensing alignment with said first triggering element for selectively blocking spray of said solution from the spray means, said first safety switching means being operable in a first mode to operatively block the spray of said solution from the spray means whenever said first triggering element is not positioned in its said one resting position, and being operable in a second switching mode to enable the spray of said solution from the spray means whenever said triggering element is operatively positioned in its said one resting position.

17. The apparatus as recited in claim 16, wherein said safety control means further comprises:
   a. locking means mounted to engage the container for securely locking the container in its said inverted operative position overlying said inlet port, said locking means being operable in an unlocked position to enable free movement of the container relative to said inlet port, and being operable in a locked position to immovably secure the container in its said operative position overlying said inlet port; and
   b. second safety switching means responsive to movement of said locking means for selectively blocking said solution spray from the spray means, said second safety switching means being operative in its first mode to block said solution spray from the spray means whenever said locking means is operatively positioned in its unlocked position, and being operable in a second mode to enable said solution spray from the spray means whenever said locking means is operatively positioned in its said locked position.

18. The apparatus as recited in claim 17, wherein said first fluid control means includes pump means for directing a fluid flow path of said solution from the reservoir to the spray means; and an energizing circuit path for said pump means, said energizing circuit path including said first and said second safety switching means connected in electrical series as part thereof, said first and said second safety switching means being operable to energize said pump means so as to prevent a fluid flow path of said solution to the spray means whenever either of said first or said second safety switching means is operative in its respective said first mode.

19. Apparatus for preparing a concentrated detergent solution, comprising:
   a. a container suitable for carrying a powdered detergent and having a downwardly facing substantially completely open end;
   b. a curved screen member mounted to said container at its open end and projecting inwardly from the open end in the direction toward the detergent carrying portion of the container, said screen member having a mesh continuously extending across said open end and sized to prevent the powdered detergent carried within the container from passing therethrough;
   c. a reservoir suitable for holding a detergent solution disposed below said container and having an inlet port aligned with the open end of said container;
   d. a single spray-forming nozzle mounted at the inlet port of said reservoir for forming a spray of fluid passing therethrough and for directing the spray on substantially the entire downwardly facing concave surface of said screen member to dissolve that portion of the powdered detergent lying on and immediately adjacent the screen member into a detergent solution which passes through the screen into the underlying reservoir;
   e. controlled supply means for periodically directing solution from said reservoir through said nozzle to maintain a supply of detergent solution within said reservoir for use by remote apparatus, said supply means being operable to maintain the concentration level of said solution in said reservoir within a predetermined range; and
   f. safety control means connected with said controlled supply means for sensing the position of said container relative to said inlet port and for automatically preventing said solution from passing through said nozzle when said container is not positioned in overlying relationship with said nozzle so as to completely intercept spray emanating therefrom.

20. The apparatus as recited in claim 19, further including a second screen member fixedly mounted to said reservoir, continuously extending across said inlet port thereto and having a mesh sized to prevent the powdered detergent carried by said container from passing therethrough; said second screen member having an opening therethrough sized to cooperatively accept said nozzle for permitting unobstructed spray from said nozzle above the upper surface of said second screen member.

21. The apparatus as recited in claim 19, further including cradle assembly means mounted to cooperatively engage said container for pivotally positioning said container in an inverted operative position overlying said inlet port to said reservoir.

22. The apparatus as recited in claim 21, wherein said safety control means includes sequentially operable switching means cooperatively connected with said cradle assembly means for automatically preventing solution flow through said nozzle whenever said container is not operatively positioned overlying said inlet port to said reservoir.

23. Apparatus for withdrawing as a concentrated detergent solution, powdered detergent from a substantially completely open end of a container holding such detergent, comprising:
   a. a chassis defining a reservoir for a detergent solution, said chassis having an upper inlet port opening into said reservoir;
   b. container receptor means having a retaining base for matingly accepting the open end of the container, a curved screen member sized to extend across the retaining base for entirely covering the open end of a container matingly engaged with said retaining base and having a mesh sized for preventing powdered detergent from passing therethrough, and means for securing the retaining base and screen members to a container at its open end;
   c. means for rapidly positioning said receptor means and affixed container in cooperative engagement with said chassis at its said inlet port such that said retaining base of said receptor means is aligned with said inlet port, forming a continuum between the reservoir and the inside of the container affixed to said receptor means;
   d. spray means for periodically directing a spray of solution from said reservoir at substantially the entire downwardly facing surface of said screen member for hydrating a portion of the powdered detergent carried thereby which passes in solution through the screen member and into the underlying reservoir; and
   e. safety control means responsive to said positioning means for preventing spray of solution from said spray means whenever said receptor means and affixed container are not operatively positioned in inverted manner overlying said inlet port of said reservoir.

* * * * *

UNITED STATES PATENT AND TRADEMARK OFFICE
CERTIFICATE OF CORRECTION

PATENT NO. : 4,020,865

DATED : May 3, 1977

INVENTOR(S) : Robert B. Moffat, David L. Nystuen, Thomas H. Imdieke

It is certified that error appears in the above-identified patent and that said Letters Patent are hereby corrected as shown below:

In column 13, line 34, the number "16" should read --116--.

In column 14, line 66, the number "40" should read --140--.

In column 15, line 15, following the word "connected" the language should read --to the--.

In column 16, line 19, the words "full-time" should read --full-line--.

In column 17, line 10, the number "20" should read --120--.

In column 17, line 32, the word "wil" should read --will--.

In column 17, line 36, the number "141" should read --142--.

In column 17, line 43, the number "20" should read --120--.

UNITED STATES PATENT AND TRADEMARK OFFICE
CERTIFICATE OF CORRECTION

PATENT NO. : 4,020,865

DATED : May 3, 1977

INVENTOR(S) : Robert B. Moffat, David L. Nystuen, Thomas H. Imdieke

It is certified that error appears in the above-identified patent and that said Letters Patent are hereby corrected as shown below:

In column 17, line 65, the word "decreases" should read --decreased--.

In column 19, line 1, the word "therover" should read --thereover--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*